United States Patent [19]

Larsson et al.

[11] Patent Number: 4,594,018
[45] Date of Patent: Jun. 10, 1986

[54] TURNBUCKLE

[75] Inventors: Göran Larsson, Hisings Kärra; Peter Sundman, Onsala, both of Sweden

[73] Assignee: Riggarna Sundman, Larsson & Josefsson AB, Vastra Frolunda, Sweden

[21] Appl. No.: 638,966

[22] PCT Filed: Dec. 7, 1983

[86] PCT No.: PCT/SE83/00431
 § 371 Date: Aug. 6, 1984
 § 102(e) Date: Aug. 6, 1984

[87] PCT Pub. No.: WO84/02381
 PCT Pub. Date: Jun. 21, 1984

[30] Foreign Application Priority Data

Dec. 7, 1982 [SE] Sweden .................................. 8206967

[51] Int. Cl.$^4$ .............................................. F16G 11/12
[52] U.S. Cl. ...................................... 403/43; 403/46; 403/60; 403/78
[58] Field of Search .................. 403/43–45, 403/46, 60, 78; 59/9, 95; 24/71.1; 254/98, 231

[56] References Cited

U.S. PATENT DOCUMENTS

| | | | |
|---|---|---|---|
| 1,002,001 | 8/1911 | Short | 403/43 |
| 1,003,355 | 9/1911 | Green | 403/60 |
| 2,318,119 | 5/1943 | Westhaver | 59/95 |
| 2,420,363 | 5/1947 | Kspenas | 403/43 |
| 2,851,294 | 9/1958 | Mount | 403/78 |
| 2,903,283 | 9/1959 | Sweetland | 403/78 |
| 3,163,079 | 12/1964 | Schertz | 403/43 X |
| 3,270,494 | 9/1966 | Holmes | 59/95 |
| 4,195,798 | 4/1980 | Costantino et al. | 403/78 X |

FOREIGN PATENT DOCUMENTS 731796 6/1955 United Kingdom ................. 403/46

Primary Examiner—Cornelius J. Husar
Assistant Examiner—Todd G. Williams
Attorney, Agent, or Firm—Holman & Stern

[57] ABSTRACT

A turnbuckle is formed with a sleeve having a first fixing member threaded into one end and a second fixing member rotatably received in the other end of the sleeve. The second fixing member is formed by a shank and a screw threaded into the end of the shank and fixed in place by a transverse pin. The head of the screw is trapped internally of the sleeve against an internal shoulder. The structure of the second fixing member allows the turnbuckle to be readily dismantled and portions thereof replaced.

7 Claims, 3 Drawing Figures

U.S. Patent    Jun. 10, 1986    4,594,018
FIG 1    FIG 2
FIG 3
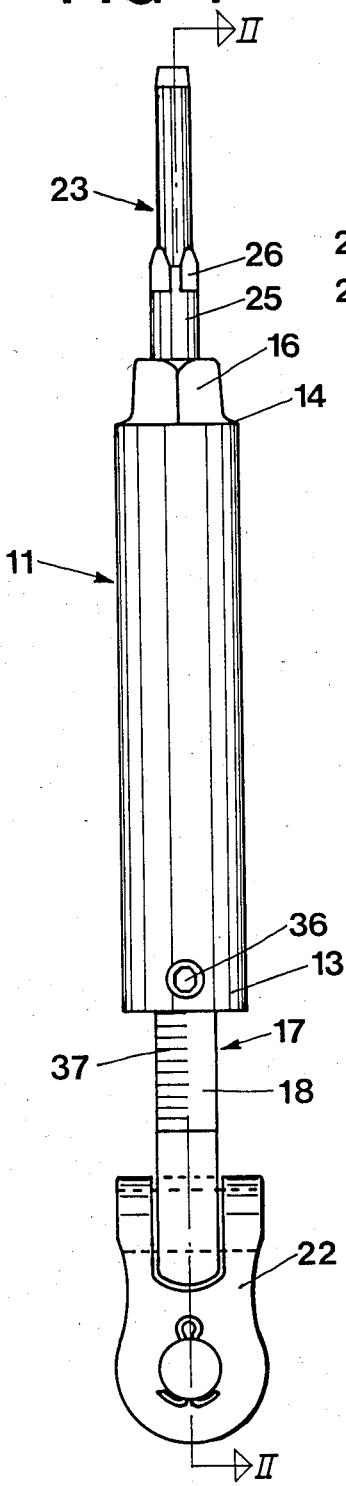
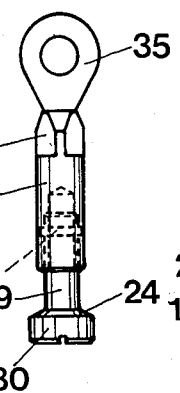
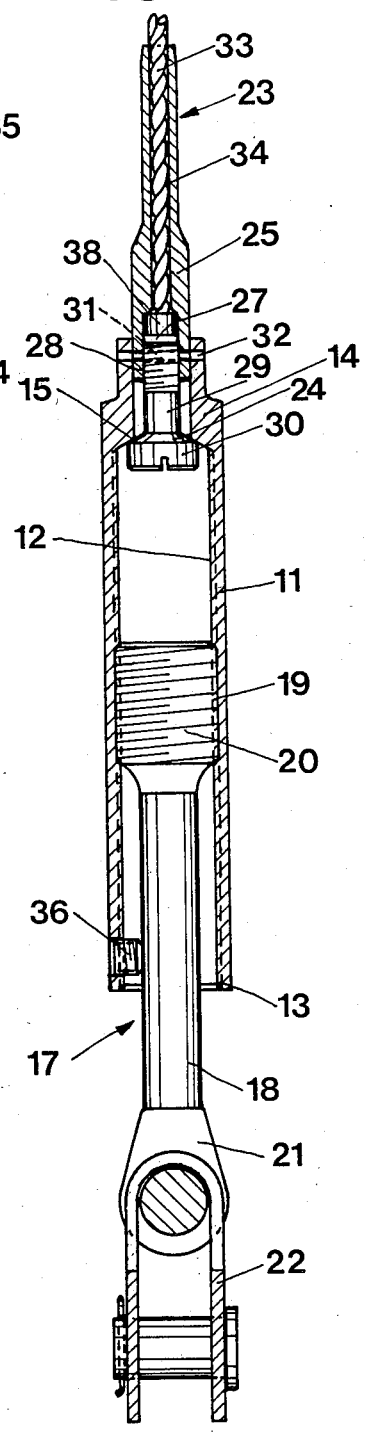

TURNBUCKLE

CROSS REFERENCE TO RELATED APPLICATION(S)

This U.S. application stems from PCT International Application No. PCT/SE83/00431 filed Dec. 7, 1983.

The present invention relates to a turnbuckle of the kind comprising a first and a second fixing member arranged at opposite ends of a sleeve, which is rotatable, at which the turnbuckle can be extended or shortened, said sleeve along a substantial part of its length being provided with nut threads, designed for cooperation with corresponding screw threads at a pin arranged at one end of said first fixing member, the length of said pin being considerably shorter than the length of the nut threads of the sleeve, and at the opposite end of the sleeve inside it there is arranged a seat for the second fixing member which extends through said end portion and which is designed as a swivel.

BACKGROUND OF THE INVENTION

Turnbuckles such as cable stretches, rig stretchers etc are known in many different designs. The most common occuring turnbuckle consists of a left-threaded and a right-hreaded screw, threaded into a rotatable sleeve. By rotating the sleeve, the turnbuckle is extended or shortended. This and similar types of stretchers or tighteners show a number of disadvantages. The threads of the turnbuckle is mostly uncovered and exposed for weather and wind, at which corrosion attack and locking-up caused thereof may result. The uncovered threads also results in that wires, canvas etc. can be torn by contacting the turnbuckle. It is very easy to turn such a turnbuckle incorrectly, i.e. upside down, so that by rotating the sleeve to the right, the screws can come loose from the sleeve and serious damages may result, if the turnbuckle for example guys a mast to a boat.

In order that the turnbuckle should not be opened unintentially, it is necessary to lock it, which generally must be done with split pins or the like, which also provides projecting sharp details, which not only can cause damages but may also be easily lost.

In order to protect ropes and sails from wear when contacting the turnbuckle it is also previously known to use a plastic turnbuckle protector, which is locked up around the turnbuckle. The protector provides a complication and is not particularly effective either, so they are easily loosened when a line is pulled around such a protector.

Especially if the turnbuckle is used on ships and boats there is a great risk that the different parts by corrosive action cling to each other, not only the threads but also the swivel. As the turnbuckle must be able to transfer relatively great traction it is often made of stainless steel, which however is without lubricating characteristics and after continuous loading the above mentioned disadvantages appears.

THE OBJECT OF THE INVENTION AND ITS MOST IMPORTANT FEATURES

The object of the present invenion is to provide a turnbuckle which on the outside is completely flat independent of the threaded position of the turnbuckle parts relative to each other. Another object is to provide a simple construction, which is easy to adjust which cannot be turned incorrectly, which by rotating the sleeve in right hand helice always provides a shortening of the turnbuckle and which is capable to withstand hard external stresses without that the threads are damaged. Another object is to provide a turnbuckle which also in very corrosive atmospheres and after prolonged loading is essentially mobile as a new turnbuckle. A desire is also that it should be possible to use the turnbuckle for different purposes and be able to replace a wire attachment for a schackle attachment without missing the other advantages. These objects have been solved by the fact that the second fixing member comprises a shank which at one end portion is designed with an axial internally threaded recess for a screw, the screw head of which is designed with a bearing surface corresponding to said seat, that the screw is non-rotatably connected to the shank, which with its end portion remote from the screw is designed alternatively with an attachment ear located outside the sleeve, or with a extension of the shank provided with an axial through bore, which by means of a shoulder passes into the recess provided with said threads.

DESCRIPTION OF THE DRAWINGS

FIG. 1 shows the turnbuckle according the invention in side view,

FIG. 2 shows a cross section according to the line II—II in FIG. 1, and

FIG. 3 shows an alternative design of the second fixing member in side view.

DESCRIPTION OF THE EMBODIMENTS

The turnbuckle according the invention consists of a sleeve 11, which on the inside is provided with nut threads 12, which extend from one end of the sleeve 13 and along the substantial part of its length. At the opposite end 14 of the sleeve 12 there is arranged a step shaped seat 15, from which the sleeve has a somewhat smaller inner diameter. On the outside of the sleeve end 14 this is designed with a non-round cross section, preferably with a square portion 16 designed as a key grip. A first fixing member 17 can be screwed in the threaded end 13 of the sleeve which first fixing member consists of a shank 18, one end of which is provided with a screw-threaded 19 pin 20 with larger diameter than the shank, while at the opposite end there is arranged an ear 21, which can be connected with a schackle 22 or the like.

On the opposite end of the sleeve there is arranged the seat 15 adapted as a holding-up for a second fixing member 23 which with a corresponding bearing surface 24 rests against the seat 15. The second fixing member 23 in the embodiment showed at FIGS. 1 and 2 is besides designed as wire bolt and is furthermore shaped as a swivel, which means that the fixing member can rotate in the sleeve 11 around its longitudinal axle. The second fixing member 23 comprises a shank 25 having such a length that it extends outside the sleeve 11 and which on its outer end is provided with a non-round portion 26 designed as a key grip.

On the opposite end of the shank 25 located in the sleeve 11 is provided a recess 27 which is partly designed with internal threads 28 for a screw 29. The head 30 of the screw is shaped with a bevelled portion 24, which forms said bearing surface and which cooperates with the seat 15. The screw is preferably manufactured from silicon bronze, while the shank is made of stainless stell. In order to prevent the screw from rotating in the shank, it is locked by means of a pin 31. This can be fixed when the second fixing member 23 is located outside the sleeve, but it is also possible to provide a bore 32 through the sleeve 11 and to lock the screw 29 first when it is placed in its correct position in the sleeve.

The shank 25 as illustrated in FIG. 2 could be designed as an attachment for a wire 33 for which purpose the shank is provided with a through bore 34 which opens into the space 27 where the wire joint 38 is placed. It is also possible to design the shank 25 with an ear 35 for connection of a schackle or the like, as shown in FIG. 3. This design gives a freedom of choice and it is possible better to adapt the turnbuckle to the local conditions.

The sleeve 11 is preferably made of silicon bronze and both fixing members of stainless steel, whereby shearing is effectively prevented. By designing the screw pin 20 with relatevely great diameter as well as the internal nut threads of the sleeve it is obtained a larger thread surface which is in engagement, compared with the previous case with lower friction and larger length of life as a result. The design of the second fixing member 23 as swivel has meant that the rope or wire connected to this member will not be subjected to torsional stress at the same time as the turnbuckle could be designed with simple right hand threads which also means, that the turnbuckle according the invention could not be changed incorrectly. By using the internal threads in the sleeve 11 and as the threaded pin 20 cannot be screwed out of the sleeve there is obtained a totally smoth turnbuckle which does not damage sails and ropes and which neither can be subjected to damages or be filled with impurities.

With the help of a stop screw 36 at the end 13 of the sleeve 11 it is prevented that the threaded pin 20 can leave the sleeve at the same time as a simple fixing can be provided between the first fixing member 17 and the sleeve 11. By adjusting a mast of racing boats it is very important to be able to adjust the turnbuckles on both sides of the mast with the same strength and for this object there is on the shank 18 of the first fixing member, disposed a trimming scale 37, showed in FIG. 1. By adjusting the tensional force of the turnbuckle, the locking screw 36 is loosened, whereupon an adjustable wrench is tightened around the key grip 16 and another key around the key grip 26, which both are located on convenient handling space from each other, so that the adjustment can be easily done.

The invention is not limited to the illustrated embodiments but a number of variations are possible within the scope of the claims.

We claim:

1. A turnbuckle comprising an internally threaded sleeve, a first fixing member having an externally threaded end portion threaded into the sleeve from one end of the sleeve with the first fixing member extending from said one end of the sleeve, an internal shoulder defining an internal seat at the other end of the sleeve, and a second fixing member comprising a shank with an internally threaded end portion, a screw threaded into said end portion, and transverse pin means connected between the end portion and the screw for fixing the screw to the shank, the screw having a screw head trapped internally of the sleeve by said seat with the shank extending outwardly from said other end of the sleeve, and said second fixing member being free to rotate in said sleeve with said seat forming a bearing surface for the screw head.

2. The turnbuckle as defined in claim 1 wherein the sleeve is formed with a transverse opening adjacent said other end for providing access to said pin means.

3. The turnbuckle as defined in claim 1 wherein said shank is formed with a longitudinal bore and internal seat for receipt of a headed cable.

4. The turnbuckle as defined in claim 1 wherein said shank is provided with a lifting eye externally of the sleeve.

5. The turnbuckle as defined in claim 1 wherein a portion of the sleeve at said other end is provided with flat peripheral gripping surfaces and a portion of the shank external to the sleeve is also provided with flat peripheral gripping surfaces.

6. The turnbuckle as defined in claim 1 including a transverse locking screw at said one end of the sleeve for non-rotatably fixing the first fixing member in the sleeve.

7. The turnbuckle as defined in claim 1 wherein the first fixing member is provided with a scale.

* * * * *